United States Patent
Liang et al.

(12)

(10) Patent No.: US 12,515,200 B2
(45) Date of Patent: Jan. 6, 2026

(54) SUPPORTED OCM CATALYST COMPOSITION HAVING IMPROVED PRODUCT SELECTIVITY AND CATALYST ACTIVITY

(71) Applicant: SABIC Global Technologies B.V., Bergen op Zoom (NL)

(72) Inventors: Wugeng Liang, Sugar Land, TX (US); Hector Perez, Sugar Land, TX (US); Pankaj Singh Gautam, Sugar Land, TX (US); David West, Sugar Land, TX (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 562 days.

(21) Appl. No.: 17/921,772

(22) PCT Filed: Feb. 22, 2021

(86) PCT No.: PCT/US2021/019019
§ 371 (c)(1),
(2) Date: Oct. 27, 2022

(87) PCT Pub. No.: WO2021/225665
PCT Pub. Date: Nov. 11, 2021

(65) Prior Publication Data
US 2023/0166239 A1 Jun. 1, 2023

Related U.S. Application Data

(60) Provisional application No. 63/019,448, filed on May 4, 2020.

(51) Int. Cl.
| | | |
|---|---|---|
| B01J 21/04 | (2006.01) | |
| B01J 21/06 | (2006.01) | |
| B01J 21/08 | (2006.01) | |
| B01J 23/02 | (2006.01) | |
| B01J 23/10 | (2006.01) | |
| B01J 35/40 | (2024.01) | |
| B01J 35/51 | (2024.01) | |
| B01J 35/61 | (2024.01) | |
| B01J 37/02 | (2006.01) | |
| B01J 37/08 | (2006.01) | |
| C07C 2/84 | (2006.01) | |

(52) U.S. Cl.
CPC ............. B01J 23/10 (2013.01); B01J 21/04 (2013.01); B01J 35/612 (2024.01); B01J 37/0207 (2013.01); B01J 37/0213 (2013.01); B01J 37/088 (2013.01); C07C 2/84 (2013.01); B01J 35/40 (2024.01); B01J 35/51 (2024.01); C07C 2521/04 (2013.01); C07C 2523/10 (2013.01)

(58) Field of Classification Search
CPC ... B01J 21/04; B01J 21/06; B01J 21/08; B01J 23/02; B01J 23/10; B01J 35/40; B01J 35/51; B01J 35/612; B01J 37/0207; B01J 37/0213; B01J 37/088; C07C 2/84
USPC .......................... 502/302–304, 355, 415, 439
See application file for complete search history.

(56) References Cited

U.S. PATENT DOCUMENTS

| | | | |
|---|---|---|---|
| 6,087,545 A | 7/2000 | Choudhary et al. | |
| 9,963,402 B2 | 5/2018 | Cizeron et al. | |
| 11,090,633 B2 * | 8/2021 | Liang | B01J 23/30 |
| 11,091,410 B2 * | 8/2021 | Liang | B01J 23/10 |
| 11,154,841 B2 * | 10/2021 | Liang | B01J 23/10 |
| 11,439,984 B2 * | 9/2022 | Liang | B01J 35/657 |
| 11,458,458 B2 * | 10/2022 | Liang | C07C 2/84 |
| 11,541,375 B2 * | 1/2023 | Liang | C01G 41/006 |
| 11,633,721 B2 * | 4/2023 | Liang | B01J 37/0228 585/500 |
| 11,753,357 B2 * | 9/2023 | Liang | B01J 35/66 502/303 |
| 11,986,800 B2 * | 5/2024 | Liang | B01J 23/002 |
| 12,030,037 B2 * | 7/2024 | Liang | B01J 37/0201 |
| 2016/0340272 A1 | 11/2016 | Cizeron et al. | |
| 2019/0275499 A1 * | 9/2019 | Liang | B01J 23/10 |
| 2020/0024214 A1 | 1/2020 | Cizeron et al. | |
| 2020/0048164 A1 * | 2/2020 | Sarsani | C07C 9/06 |

(Continued)

FOREIGN PATENT DOCUMENTS

| | | |
|---|---|---|
| JP | 2011032257 A | 2/2011 |
| WO | 2012162526 A2 | 11/2012 |

(Continued)

OTHER PUBLICATIONS

Filing Receipt and Specification for provisional patent application entitled "Supported OCM Catalyst Composition Having Improved Product Selectivity And Catalyst Activity," by Wugeng Liang, et al., filed May 4, 2020 as U.S. Appl. No. 63/019,448, 31 pages.

(Continued)

*Primary Examiner* — Cam N. Nguyen
(74) *Attorney, Agent, or Firm* — Conley Rose, P.C.; Rodney B. Carroll

(57) ABSTRACT

The invention relates to a composition containing an oxide supported oxidative coupling of methane catalyst having an excellent balance of catalytic activity and selectivity while retaining desired levels mechanical stability suitable for commercial reactor application. Particularly, the inventive catalyst is an oxide supported catalyst with the oxide catalyst support having a spherical diameter of less than 2 mm and a surface area of less than less than 9.5 $m^2/g$ while retaining a water sorption volume of at least 0.2 cc/g. The invention further provides a method for preparing such a composition containing an oxide supported catalyst, using a combination of thermal treatment of the oxide catalyst support, active component impregnation and followed up by calcination. Additionally, the invention also describes a process for producing $C_{2+}$ hydrocarbons, using such a catalyst composition.

19 Claims, No Drawings

(56) References Cited

U.S. PATENT DOCUMENTS

2020/0101443 A1* 4/2020 Liang .................. B01J 23/002
2020/0238256 A1* 7/2020 Zurcher ................ B01J 35/59
2020/0353446 A1* 11/2020 Liang ...................... C07C 2/84

FOREIGN PATENT DOCUMENTS

| WO | 20180164983 A1 | 9/2018 |
| WO | 2019048404 A1 | 3/2019 |
| WO | 20210225665 A1 | 11/2021 |

OTHER PUBLICATIONS

Foreign communication from related application—Notice of Filing Receipt, dated Oct. 27, 2022 regarding Saudia Arabia Application No. 522441081 filed Feb. 22, 2021, 2 pages.

Foreign communication from related application—International Search Report and Written Opinion of the International Searching Authority, dated Jun. 16, 2021 regarding International Application No. PCT/US2021/019019 filed Feb. 22, 2021, 9 pages.

Foreign communication from related application—International Preliminary Report of Patentability, dated Nov. 17, 2022 regarding International Application No. PCT/US2021/019019, filed Feb. 22, 2021, 6 pages.

\* cited by examiner

SUPPORTED OCM CATALYST COMPOSITION HAVING IMPROVED PRODUCT SELECTIVITY AND CATALYST ACTIVITY

CROSS REFERENCE TO RELATED APPLICATION

This application is a filing under 35 U.S.C. 371 of International Application No. PCT/US2021/019019 filed Feb. 22, 2021, entitled "Supported OCM Catalyst Composition Having Improved Product Selectivity and Catalyst Activity" which claims priority to U.S. Provisional Application No. 63/019,448 filed May 4, 2020, which applications are incorporated by reference herein in their entirety.

FIELD OF INVENTION

The invention relates to the field of catalyst compositions used for the oxidative coupling of methane (OCM).

BACKGROUND

Methane is a widely available feedstock and if oxidatively coupled, in presence of certain methane coupling catalysts, commercially high value chemicals, such as ethylene and other $C_{2+}$ hydrocarbons, can potentially be produced at high production margins. However, one of the reasons why catalyst systems for the oxidative coupling of methane has not been used commercially, is because traditional OCM catalyst system suffer from low catalytic activity as well as low product selectivity. Product selectivity, in particular is a concern for OCM processes where the severe reaction conditions often lead to the production of thermodynamically stable carbon oxide products ($CO_x$) instead of the commercially desired $C_{2+}$ hydrocarbons. In addition, the existing catalyst systems have poor mechanical integrity, which are not suitable for commercial applications especially under severities of an OCM reaction process.

One possible way of achieving the desired level of catalyst performance is by using a supported catalyst system, where the particle size of the support and the resulting catalyst system is suitably controlled. As has been observed previously, if the particle size of the catalyst system is too large, mass and heat transfer resistance is enhanced, lowering both catalyst activity and product selectivity. Further, for catalyst systems having large particle size, there is an enhanced risk for gas by-passing through voids between particles, which in turn lowers the overall conversion yield. With the aim of reducing the gas by-passing, especially for a short bed reactor in an autothermal operation, it may be reasonable to expect catalyst particles having small particle size may be particularly suited for enhanced catalyst performance. However, traditional methods of preparing oxidative catalyst having small particle size such as tableting or extrusion although effective are not technically or economically viable for industrial scale application. In addition, it was observed that for enhancing catalyst performance, the catalyst particles should be of suitable dimension, so as to enable high catalytic activity, while retaining with desired level of product selectivity.

Attempts to develop such catalyst systems have been discussed in various publications. One such catalyst system reported to have suitable selectivity for $C_{2+}$ hydrocarbons, is the catalyst system represented by the general formula $Mn-Na_2WO_4/SiO_2$. Arndt et. al in their publication (Applied Catalysis A: General, Volumes 425-426, 28 May 2012, Pages 53-61), provides a general review article for such catalyst systems when used in methane coupling reactions. However, as described in the publication, $Mn-Na_2WO_4/SiO_2$ catalyst systems are susceptible to deactivation under certain processing conditions, thereby posing additional plant operation challenges. Other published literature such as the published patent WO2015101345A1 (Published: July 2015) or EP3194070A2 (Published: July 2017) or U.S. Pat. No. 9,963,402 (Published: July 2017) describe the use of mixed metal oxides having a specific combination of rare earth metals, suitable for oxidative coupling of methane while retaining high temperature stability. On the other hand, the patent application WO2019048404, describes an OCM catalyst having a silica carrier, with a spherical diameter in the range of 50 microns to 200 microns and having an active catalyst component comprising manganese and an alkali metal dopant. Although the selectivity performance of the catalyst system disclosed in WO2019048404 is promising, the stability of the catalyst, catalytic activity and product selectivity performance can be further improved for commercial viability.

Therefore, for the foregoing reasons there remains a need to develop a catalyst system capable of being produced at an industrial scale, having small particle size having one or more benefits of having high product selectivity while retaining suitable catalyst activity and mechanical strength.

SUMMARY

A solution to some or all of the drawbacks and limitations described above, resides in the present inventive composition containing an OCM catalyst. Accordingly, the present invention relates to a composition, comprising a catalyst represented by a general formula (I): $(AE_aRE1_bRE2_cAT_dO_x)/M_mO_n$ wherein, (i) 'AE' represents an alkaline earth metal; (ii) 'RE1' represents a first rare earth element; (iii) 'RE2' represents a second rare earth element; (iv) 'AT' represents a third rare earth element 'RE3', or a redox agent 'RX' selected from antimony, tin, nickel, chromium, molybdenum, tungsten, manganese, bismuth; wherein, 'a', 'b', 'c', and 'd' each independently represent relative molar ratio; wherein 'a' ranges from about 0.1 to about 5; 'b' ranges from about 0.1 to about 10; 'c' ranges from 0.1 to about 10; 'd' ranges from 0 to about 10; 'x' balances the oxidation state; wherein, the first rare earth element, the second rare earth element and the third rare earth element, are different; (v) $M_mO_n$ represents an oxide catalyst support, wherein 'M' is selected from a metal or silicon; 'm' and 'n' are any positive number and ranges from about 1 to about 5; wherein, the oxide catalyst support comprises particles having a spherical diameter less than 2 mm; wherein the oxide support comprises particles having a surface area less than 9.5 $m^2/g$; and further wherein the oxide catalyst support has a water sorption volume of at least 0.2 cc/g. For the purposes of the present invention, general formula (I) $(AE_aRE1_bRE2_cAT_dO_x)/M_mO_n$ represents a catalyst system having at least two components: an active mixed metal oxide component $(AE_aRE1_bRE2_cAT_dO_x)$ and an oxide catalyst support $(M_mO_n)$ component, where the active mixed metal oxide component is impregnated and calcined in the oxide catalyst support. Further, it is understood by those skilled in art that where reference is made herein to balancing of the oxidation state with respect to the composition, the balancing is to achieve electro-neutrality of the overall composition containing the catalyst of the present invention.

In some embodiments of the invention, the oxide catalyst support comprises particles having a surface area ranging from 0.01 m²/g to 9 m²/g. The surface area and pore volume was determined by measuring nitrogen adsorption according to the Brunauer, Emmett and Teller (BET) method. The BET experiment was carried out by using Quantachrome Autosorb®-6iSA. In some embodiments of the invention, the oxide catalyst support comprises particles having a spherical diameter ranging from 0.1 mm to 0.95 mm. The expression "spherical diameter" or "spherical particle diameter" means the volume equivalent spherical diameter 'D' for a particle having volume 'V', such that the diameter can be calculated using the equation $D=(6*V/\pi)^{1/3}$. In other words, using the above technique the "spherical diameter" of even non-spherical particle can be calculated by assuming the volume 'V' to be equivalent to the volume of a sphere with a diameter 'D'. The volume 'V' can be calculated by determining the dimension of the particle using microscopic techniques such as scanning electron microscopy (SEM), transmission electron microscopy (TEM) or by using a measuring scale in case the size of the particles are at a millimeter scale.

In some embodiments of the invention, the oxide catalyst support has a water sorption volume ranging from 0.3 cc/g to 0.8 cc/g. For the purposes of the present invention, the water sorption volume was measured using the incipient wetness method. In some embodiments of the invention, the oxide catalyst support has a mechanical strength of at least 10 N when determined in accordance with ASTM (D4179-01). The expression "mechanical strength" as used throughout this disclosure, means the resistance of a catalyst to compressive force. In other words, mechanical strength is the force in Newton applied, to crush the catalyst. For the purpose of measurement, the catalyst once formed was placed between metal plates with one of the plate moved towards the other plate until the catalyst particle was crushed. The crush test was repeated with reasonable number of catalyst samples and the resulting data was averaged.

In some embodiments of the invention, the oxide catalyst support comprises particles having a surface area ranging from 0.01 m²/g to 9 m²/g and a water sorption volume ranging from 0.3 cc/g to 0.8 cc/g. The surface area and pore volume was determined by measuring nitrogen adsorption according to the Brunauer, Emmett and Teller (BET) method. The BET experiment was carried out by using Quantachrome Autosorb®-6iSA.

In some embodiments of the invention, the alkaline earth metal 'AE' is selected from the group consisting of magnesium, calcium, strontium, barium, and combinations thereof. In some preferred embodiments of the invention, the alkaline earth metal 'AE', is strontium. In some other embodiments of the invention the first rare earth element 'RE1', the second rare earth element 'RE2', and the third rare element 'RE3', are each independently selected from the group consisting of lanthanum, scandium, cerium, praseodymium, neodymium, promethium, samarium, europium, gadolinium, yttrium, terbium, dysprosium, holmium, erbium, thulium, ytterbium, lutetium, and combinations thereof. In some embodiments of the invention, the metal 'M' of the oxide catalyst support $M_mO_n$ is selected from aluminum, zinc, tin (II), and lead (II). In some embodiments of the invention, the oxide catalyst support $M_mO_n$ is aluminum oxide ($Al_2O_3$) comprising particles having a spherical diameter of less than 2 mm.

In some preferred embodiments of the invention, the alkaline earth metal 'AE' is strontium, the first rare earth element 'RE1' is lanthanum, the second rare earth element 'RE2' is ytterbium, the third rare earth element 'RE3' is neodymium and the oxide catalyst support is aluminum oxide ($Al_2O_3$) comprising particles having a spherical diameter of less than 2 mm. In some preferred embodiments of the invention, the catalyst of general formula (I) is represented by a specific formula $Sr_aLa_bYb_cNd_dO_x/Al_2O_3$, wherein 'a' ranges from about 0.1 to about 0.6; 'b' ranges from about 0.5 to about 3; 'c' ranges from 0.1 to about 0.8; and 'd' ranges from greater than zero to about 0.4 and further wherein the aluminum oxide ($Al_2O_3$) has a spherical particle diameter of less than 2 mm.

In some preferred embodiments of the invention, the catalyst of general formula (I) is represented by the specific formula $Sr_{0.5}La_{1.8}Yb_{0.1}Nd_{0.7}Ox/Al_2O_3$ and further wherein the aluminum oxide ($Al_2O_3$) has a spherical particle diameter of less than 2 mm. In some aspects of the invention, the invention provides a method for preparing the composition containing the catalyst of the present invention, the method comprising: (a) providing an oxide catalyst support having spherical diameter of less than 2 mm; (b) thermal treating the oxide catalyst support at any temperature ranging from 1100° C. to 1700° C. and forming a thermally treated oxide catalyst support; (c) providing an aqueous solution of a mixed metal oxide precursor comprising at least one compound containing an alkaline earth metal 'AE', at least one compound containing a first rare earth element 'RE1', at least one compound containing a second rare earth element 'RE2' and at least one compound containing a third rare earth element 'RE3'; (d) impregnating the thermally treated oxide catalyst support with the aqueous solution of the mixed metal oxide precursor and forming a supported catalyst precursor; and (e) calcining the supported catalyst precursor at a temperature of at least 850° C. and for at least 5 hours, and forming the composition.

In some preferred embodiments of the invention, the oxide catalyst support is thermally treated at a temperature ranging from 1200° C. to 1600° C. In some embodiments of the invention, the compound containing the alkaline earth metal 'AE', the first rare earth element 'RE1', second rare earth element 'RE2' and third rare earth element 'RE3' is selected from a nitrate compound, halogen compound, carbonate compound, sulphate compound or a sulphite compound.

In some aspects of the invention, the invention describes a process for preparing a $C_{2+}$ hydrocarbon mixture product comprising (a) introducing a feed mixture comprising methane and oxygen in a reactor containing the composition containing the inventive catalyst of the present invention; (b) subjecting the feed mixture to a methane coupling reaction under conditions suitable to produce the $C_{2+}$ hydrocarbon mixture product; and (c) recovering the $C_{2+}$ hydrocarbon mixture product after removing unconverted methane from the $C_{2+}$ hydrocarbon mixture product. In some embodiments of the invention, the feed mixture has a methane to oxygen molar ratio ranging from about 2:1 to about 15:1.

Accordingly, the present invention relates to a composition, comprising a catalyst represented by a general formula (I): $(AE_aRE1_bRE2_cAT_dO_x)/M_mO_n$ wherein, (i) 'AE' represents an alkaline earth metal; (ii) 'RE1' represents a first rare earth element; (iii) 'RE2' represents a second rare earth element; (iv) 'AT' represents a third rare earth element 'RE3', or a redox agent 'RX' selected from antimony, tin, nickel, chromium, molybdenum, tungsten, manganese, bismuth; wherein; 'a', 'b', 'c', and 'd' each independently represent relative molar ratio; wherein 'a' ranges from about 0.1 to about 5; 'b' ranges from about 0.1 to about 10; 'c' ranges from 0.1 to about 10; 'd' ranges from 0 to about 10;

'x' balances the oxidation state; wherein, the first rare earth element, the second rare earth element and the third rare earth element, are different; (v) $M_mO_n$ represents an oxide catalyst support, wherein 'M' is selected from a metal or silicon; 'm' and 'n' are any positive number and ranges from about 1 to about 5; wherein, the oxide catalyst support comprises particles having a spherical diameter less than 2 mm; wherein the oxide support comprises particles having a surface area less than 9.5 $m^2/g$; and further wherein the oxide catalyst support has a water sorption volume of at least 0.2 cc/g; and wherein, the composition is prepared by a method comprising the thermal treatment of the oxide catalyst support at temperature ranging from 1100° C. to 1700° C.

Other objects, features and advantages of the invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from some specific embodiments may be combined with features from any of the other embodiments. In further embodiments, additional features may be added to the specific embodiments described herein.

DETAILED DESCRIPTION

The invention is based, in part, on the discovery that a composition containing a catalyst, which can be used for the oxidative coupling of methane (OCM) with one or more benefits of (i) suitable for industrial scale production (ii) having high product selectivity while retaining sufficient catalytic activity and (iii) suitable mechanical strength adapted for use in commercial operations, which typically operate at high reactor severity. Advantageously, the catalyst composition of the present invention is formulated using suitable thermal treatment of the oxide catalyst support, resulting in an improved balance of surface area and pore volume, thereby ensuring desired catalyst performance.

The following includes definitions of various terms, expressions and phrases used throughout this specification.

The expressions "about" or "approximately" or "substantially" are defined as being close to as understood by one of ordinary skill in the art. In some non-limiting embodiments the terms are defined to be within 1%, preferably, within 0.1%, more preferably, within 0.01%, and most preferably, within 0.001%. The expressions "wt. %", "vol. %", or "mol. %" refers to a weight, volume, or molar percentage of a component, respectively, based on the total weight, the total volume, or the total moles of material that includes the component. In a non-limiting example, 10 moles of a particular component present in a 100 moles of a material is 10 mol. % of component. The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The method of the invention can "comprise," "consist essentially of," or "consist of" particular ingredients, components, compositions, etc., disclosed throughout the specification. Any numerical range used through this disclosure shall include all values and ranges there between unless specified otherwise. For example, a boiling point range of 50° C. to 100° C. includes all temperatures and ranges between 50° C. and 100° C. including the temperature of 50° C. and 100° C.

The expression "$C_{2+}$ hydrocarbon" or "$C_{2+}$ hydrocarbon mixture product" as used in this disclosure means the hydrocarbon products having at least two carbon atoms including ethylene, ethane, ethyne, propene, propane, and $C_4$-$C_5$ hydrocarbons, which are produced using the inventive composition containing the catalyst of the present invention. The expression oxidative coupling of methane or "OCM" as referred or used throughout this disclosure means the oxidative coupling of methane or the reaction of methane and oxygen, for the production of $C_{2+}$ hydrocarbons from methane. The expression "redox agent" as used though out this disclosure means substances or elements, which are capable of undergoing or promoting either oxidation or reduction reactions.

The expression "selectivity" or "product selectivity" to a desired product or products refers to how much desired product was formed divided by the total products formed, both desired and undesired. For purposes of the disclosure herein, the selectivity to a desired product is a percentage selectivity based on moles converted into the desired product. Further, for purposes of the disclosure herein, a $C_x$ selectivity (e.g., $C_2$ selectivity, $C_{2+}$ selectivity, etc.) can be calculated by dividing a number of moles of carbon (C) from $CH_4$ that were converted into the desired product (e.g., $CC_{2H4}$, $CC_{2H6}$, etc.) by the total number of moles of C from $CH_4$ that were converted (e.g., $C_{C2H4}$, $C_{C2H6}$, $C_{C2H2}$, $C_{C3H6}$, $C_{C3H8}$, $C_{C4S}$, $C_{CO2}$, $C_{CO}$, etc.). $C_{C2H4}$=number of moles of C from $CH_4$ that were converted into $C_2H_4$; $C_{C2H6}$=number of moles of C from $CH_4$ that were converted into $C_{2H6}$; $C_{C2H2}$=number of moles of C from $CH_4$ that were converted into $C_2H_2$; $C_{C3H6}$=number of moles of C from $CH_4$ that were converted into $C_3H_6$; $C_{C3H8}$=number of moles of C from $CH_4$ that were converted into $C_3H_8$; $C_{C4S}$=number of moles of C from $CH_4$ that were converted into $C_4$ hydrocarbons ($C_{4S}$); $C_{CO2}$=number of moles of C from $CH_4$ that were converted into $CO_2$; $C_{CO}$=number of moles of C from $CH_4$ that were converted into CO; etc. Specifically, $C_{2+}$ hydrocarbon selectivity (e.g., selectivity to $C_{2+}$ hydrocarbons) refers to how much $C_2H_4$, $C_3H_6$, $C_2H_2$, $C_2H_6$, $C_3H_8$, $C_{5S}$ and $C_{4S}$ were formed divided by the total product formed which includes $C_2H_4$, $C_3H_6$, $C_2H_2$, $C_2H_6$, $C_3H_8$, $C_{4S}$, $C_{5S}$, $C_{n's}$, $CO_2$ and CO. Accordingly, a preferred way of calculating $C_{2+}$ hydrocarbon selectivity will be by using the equation (Eqn 1):

$$\left\{ \frac{\begin{array}{c}(2C_{C2H4} + 2C_{C2H6} + 2C_{C2H2} + \\ 2C_{C3H6} + 3C_{C3H8} + 4C_{C4s} + 5C_{C5s} + uC_{Cn's})\end{array}}{\begin{array}{c}(2C_{C2H4} + 2C_{C2H6} + 2C_{C2H2} + 2C_{C3H6} + 3C_{C3H8} + \\ 4C_{C4s} + 5C_{C5s} + nC_{Cn's} + C_{CO2} + C_{CO})\end{array}} \right\} \times 100$$

Specifically, a high $C_{2+}$ hydrocarbon selectivity will signify increased formation of useful $C_{2+}$ hydrocarbon products over that of undesirable carbon oxide byproducts. The term "total product formed" used in the context of measuring selectivity includes $C_2H_4$, $C_3H_6$, $C_2H_2$, $C_2H_6$, $C_3H_8$, $C_{4's}$, $C_{5's}$, $C_{n's}$ $CO_2$ and CO.

The invention as described in this disclosure provides for a composition, containing a catalyst comprising (a) an oxide based catalyst support having particles with a spherical diameter lower than 2 mm and (b) a mixed metal oxide component containing an alkaline earth metal and one or more rare earth metal. The expression "catalyst particle" as used throughout this disclosure means the catalyst comprising (i) an oxide catalyst support ($M_mO_n$) component having a spherical diameter of less than 2 mm, and (ii) an active mixed metal oxide component ($AE_aRE1_bRE2_cAT_dO_x$) impregnated within the oxide catalyst support. The expression "spherical diameter" means the volume equivalent spherical diameter 'D' for a support particle having volume 'V', such that the diameter can be calculated using the equation $D=(6*V/\pi)^{1/3}$. In other words, using the above technique the "spherical diameter" of even non-spherical particles can be calculated by assuming the volume 'V' to be equivalent to the volume of a sphere with a diameter 'D'. The volume 'V' can be calculated by determining the dimension of the particle using microscopic techniques such as scanning electron microscopy (SEM), transmission electron microscopy (TEM) or by using a measuring scale in case the size of the particles are at a millimeter scale.

In some particular aspects of the invention, the present invention is directed to a composition comprising a catalyst represented by a general formula (I): $(AE_aRE1_bRE2_cAT_dO_x)/M_mO_n$ wherein, (i) 'AE' represents an alkaline earth metal; (ii) 'RE1' represents a first rare earth element; (iii) 'RE2' represents a second rare earth element; (iv) 'AT' represents a third rare earth element 'RE3', or a redox agent 'RX' selected from antimony, tin, nickel, chromium, molybdenum, tungsten, manganese, bismuth; wherein, 'a', 'b', 'c', and 'd' each independently represent relative molar ratio; wherein 'a' ranges from about 0.1 to about 5, alternatively from about 0.2 to about 1, or alternatively from about 0.1 to about 0.6; 'b' ranges from about 0.1 to about 10, alternatively from about 0.5 to about 5, alternatively about 0.5 to about 1; 'c' ranges from 0.1 to about 10, alternatively from about 0.1 to 1, alternatively from about 0.1 to about 0.8; 'd' ranges from 0 to about 10, alternatively from about greater than zero to about 1, alternatively from about greater than zero to about 0.4; 'x' balances the oxidation state; wherein, the first rare earth element, the second rare earth element and the third rare earth element, are different; (v) $M_mO_n$ represents an oxide catalyst support, wherein 'M' is selected from a metal or silicon; 'm' and 'n' are any positive number and ranges from about 1 to about 5; wherein, the oxide catalyst support comprises particles having a spherical diameter less than 2 mm, alternatively less than 1.5 mm, alternatively less than 1 mm, or alternatively less than 0.5 mm; wherein the oxide catalyst support comprises particles having a surface area less than 9.5 $m^2/g$, alternatively less than 8 $m^2/g$, alternatively less than 5 $m^2/g$; and further wherein the oxide catalyst support has a water sorption volume of at least 0.2 cc/g; or alternatively at least 0.3 cc/g. The expression "different" as used herein means that each of the rare earth elements are different chemical elements. Further, it is understood by those skilled in art that where reference is made herein to balancing of the oxidation state with respect to the composition, the balancing is to achieve electro-neutrality of the overall composition containing the catalyst of the present invention.

As the catalytically active mixed metal oxide component is impregnated in the oxide catalyst support, the particle size of the oxide catalyst support defines the catalyst particle size of the inventive catalyst system. The oxide catalyst support comprises particles, of suitable dimension, which imparts the desired balance between catalytic activity and product selectivity performance of the inventive catalyst. Accordingly, in some embodiments of the invention, the oxide catalyst support comprises particles having a spherical diameter ranging from 0.1 mm to 0.95 mm, alternatively from 0.2 mm to 0.8 mm, or alternatively from 0.25 mm to 0.6 mm. Preferably, in some embodiments of the present invention, the oxide catalyst support comprises particles having a spherical diameter of 0.3 mm.

The surface area of the oxide catalyst support particles and the resultant catalyst system are particularly suitable for providing high catalytic activity without impeding product selectivity. Although, for the purposes of the present invention, it is desired that the oxide catalyst support particle size and thereby the catalyst system, have small particle size, such small particle tend to have higher surface area. As may be appreciated by a skilled person, it is believed that, if the surface area is too high, the overall catalyst system will have extremely high catalytic activity, which may lead to the formation of deep carbon oxide products ($CO_x$) such as carbon dioxide and carbon monoxide (i.e low product selectivity) and other byproducts while if it is too low the catalytic activity will be adversely affected. Accordingly, it is desired that the surface area of the catalyst particle be suitable for desired catalyst performance. Therefore, in some embodiments of the invention, the oxide catalyst support comprises particles having a surface area ranging from 0.01 $m^2/g$ to 9 $m^2/g$, alternatively from 0.1 $m^2/g$ to 5 $m^2/g$, alternatively from 0.5 $m^2/g$ to 4 $m^2/g$. For the purposes of the invention, the surface area can be measured by any of the known processes in art such as the Brunauer-Emmett-Teller (BET) method measured at P (equilibrium $N_2$ pressure)/$P_0$ (saturated N2 pressure)=0.30 using a mixed gas of 30% $N_2$ 70% He, followed by heating the sample at 100° C. for 24 h to eliminate the adsorbed gas prior to BET measurement. The BET experiment was carried out by using Quantachrome Autosorb®-6iSA.

To achieve a suitable balance between catalyst activity and product selectivity, the oxide catalyst particles may be thermally treated at a temperature sufficient to reduce the surface area without compromising on the pore volume of the support. As may be appreciated, pore volume is proportional to the amount of active mixed metal oxide component ($AE_aRE1_bRE2_cAT_dO_x$) that can be impregnated in the oxide catalyst support so that if the pore volume is very low the amount of active component that can be impregnated is low, which in turn affects catalyst performance. One suitable metric to measure the pore volume changes is by using the value of water sorption volume. In some embodiments of the invention, the oxide catalyst support has a water sorption volume ranging from 0.3 cc/g to 0.8 cc/g, alternatively from 0.4 cc/g to 0.6 cc/g. For the purposes of the invention, the water sorption volume can be measured using the incipient wetness method involving the use of water or a water/ethanol solution to measure the maximum amount of solution that was absorbed by the oxide catalyst support.

The expression "mechanical strength" as used throughout this disclosure means the resistance of a catalyst to compressive force. In other words, mechanical strength is the force, in Newton, applied to highest resistance before the catalyst is crushed. For the purpose of measurement, the catalyst once formed was placed between metal plates with one of the plate was moved towards other plate until the catalyst particle was crushed. The crush test was repeated with reasonable number of catalyst samples and the resulting data was averaged. The mechanical strength is one of the key parameters of supported catalyst systems, where the catalyst support is designed to have pore sizes of specific dimensions, which may render the support susceptible to brittle fracture and thereafter affect catalyst performance. Mechanical strength of the catalyst system is particularly important in some instances where the catalyst system is required to withstand reactor operations. In one aspect of the invention, the oxide catalyst support provides the suitable mechanical strength required for using the inventive catalyst in commercial applications. In some embodiments of the invention, the oxide support has a mechanical strength of at least 10 N, alternatively at least 15 N, alternatively at least 25 N, or alternatively at least 30 N, when determined in accordance with ASTM (D4179-01). In some embodiments of the invention, the mechanical strength of the oxide catalyst support ranges from 10 N to 60 N, alternatively from 15 N to 45 N, alternatively from 25 N to 40 N, when determined in accordance with ASTM (D4179-01).

Accordingly, a proper balance between surface area and water sorption volume is achieved and in some embodiments of the invention, the oxide catalyst support comprises particles having a surface area ranging from 0.01 $m^2/g$ to 9 $m^2/g$ and a water sorption volume ranging from 0.3 cc/g to 0.8 cc/g.

Referring to general formula (I), in some embodiments of the invention, the alkaline earth metal 'AE' is selected from the group consisting of magnesium, calcium, strontium, barium, and combinations thereof. In some preferred embodiments of the invention, the alkaline earth metal 'AE', is strontium. In some other embodiments of the invention the first rare earth element 'RE1', the second rare earth element 'RE2', and the third rare earth element 'RE3', are each independently selected from the group consisting of lanthanum, scandium, cerium, praseodymium, neodymium, promethium, samarium, europium, gadolinium, yttrium, terbium, dysprosium, holmium, erbium, thulium, ytterbium, lutetium, and combinations thereof. In some embodiments of the invention, the metal 'M' of the oxide catalyst support $M_mO_n$ is selected from aluminum, zinc, tin (II), and lead (II). In some preferred embodiments of the invention, the oxide catalyst support $M_mO_n$ is aluminum oxide ($Al_2O_3$) with 'M' selected to be 'Al' and 'm' being 2. In some embodiments of the invention, the oxide catalyst support ($M_mO_n$) is aluminum oxide ($Al_2O_3$) comprising particles having a spherical diameter of less than 2 mm, alternatively less than 1.5 mm, alternatively less than 1 mm, or alternatively less than 0.5 mm.

In some preferred embodiments of the invention, the alkaline earth metal 'AE' is strontium, the first rare earth element 'RE1' is lanthanum, the second rare earth element 'RE2' is ytterbium, the third rare earth element 'RE3' is neodymium and the oxide catalyst support is aluminum oxide ($Al_2O_3$) comprising particles having a spherical diameter of less than 2 mm. Without wishing to be limited by any specific theory, it is believed that the incorporation of stable rare earth metal oxides imparts catalytic stability to the composition and mitigates risks of catalyst deactivation during the oxidative coupling reaction. In some preferred embodiments of the invention, the catalyst of general formula (I) is represented by a more specific formula $Sr_aLa_bYb_cNd_dO_x/Al_2O_3$, wherein 'a' ranges from about 0.1 to about 0.6; 'b' ranges from about 0.5 to about 3; 'c' ranges from greater than zero to about 0.8; and 'd' ranges from about greater than zero to about 0.4 and further wherein the aluminum oxide ($Al_2O_3$) has a spherical particle diameter of less than 2 mm. In some preferred embodiments of the invention, the catalyst of general formula (I) is represented by a more specific formula $Sr_{0.5}La_{1.8}Yb_{0.1}Nd_{0.7}Ox/Al_2O_3$ and further wherein the aluminum oxide ($Al_2O_3$) has a spherical particle diameter of less than 2 mm.

Further, without wishing to be bound by any specific theory and by way of this disclosure, it is believed that the synergistic combination of (i) oxide catalyst support such as aluminum oxide/alumina having a spherical particle diameter of less than 2 mm, with (ii) rare earth elements such as lanthanum, which promotes OCM catalyst activity, (iii) alkaline earth element such as strontium and neodymium, which promotes $C_{2+}$ hydrocarbon selectivity, along with (iv) suitable balance of surface area and water sorption volume of the oxide catalyst support, enables the composition containing the catalyst of the present invention, to demonstrate excellent product selectivity without compromising on the catalytic activity. For the purposes of the present invention, a parameter, which serves as a convenient proxy for catalytic activity is the temperature at which 90% of the oxygen conversion takes place during the OCM reaction between methane and oxygen, herein represented as $(T(90\%)°C)$. In this way, lower values of $(T(90\%)°C)$ indicate higher catalytic activity than do higher values of $(T(90\%)°C)$. In some preferred embodiments of the invention, the $(T(90\%)°C)$ value ranges from In some aspects of the invention, the invention is directed a method for preparing the composition containing the catalyst of the present invention represented by the general formula (I), the method comprising: (a) providing an oxide catalyst support having spherical diameter of less than 2 mm; (b) thermal treating the oxide catalyst support at any temperature ranging from 1100° C. to 1700° C., alternatively ranging from 1200° C. to 1650° C., alternatively from 1200° C. to 1600° C. and forming a thermally treated oxide catalyst support; (c) providing an aqueous solution of a mixed metal oxide precursor comprising at least one compound containing an alkaline earth metal 'AE', at least one compound containing a first rare earth element 'RE1', at least one compound containing a second rare earth element 'RE2' and at least one compound containing a third rare earth element 'RE3'; (d) impregnating the thermally treated oxide catalyst support with the aqueous solution of the mixed metal oxide precursor and forming a supported catalyst precursor; and (e) calcining the supported catalyst precursor at a temperature of at least 850° C. and for at least 5 hours, alternatively at least 6 hours, and forming the composition. As evidenced from the results shown under Table 2 in the example section, the thermal treatment of the oxide catalyst support at a particular temperature range is particularly useful as it was found that that upon thermally treating the oxide catalyst support within the specific temperature range, the surface area of the oxide catalyst support may be reduced to a level without adversely affecting pore volume of the oxide catalyst support.

In some embodiments of the invention, the aqueous solution of the mixed metal oxide precursor, comprises at least one compound containing (i) an alkaline earth metal 'AE', (ii) at least one compound containing a first rare earth element 'RE1', (iii) at least one compound containing a second rare earth element 'RE2' and (iv) at least one compound containing a third rare earth element 'RE3'. In some embodiments of the invention, the compound containing the alkaline earth metal 'AE', the first rare earth element 'RE1', second rare earth element 'RE2' and third rare earth element 'RE3' are selected from a nitrate compound, halogen compound, carbonate compound, sulphate compound or a sulphite compound.

In some embodiments of the invention, the aqueous solution of the mixed metal precursor can be prepared by dissolving in water at least one compound containing an alkaline earth metal 'AE', at least one compound containing a first rare earth element 'RE1', at least one compound containing a second rare earth element 'RE2', at least one compound containing a third rare earth element 'RE3'. In some preferred embodiments of the invention, the compound chosen is a nitrate salt for each of alkaline earth metal (AE), the first rare earth element (RE1), the second rare earth element (RE2), and the third rare earth element (RE3). In some embodiments of the invention, the mixed metal oxide precursor is obtained by dissolving the nitrate salts of alkaline earth metal (AE), first rare earth element (RE1), second rare earth element (RE2) in water.

In some aspects of the invention, a composition comprising a $C_{2+}$ hydrocarbon mixture product is formed using the composition of the present invention containing the catalyst of the present invention. In some aspects of the invention, $C_{2+}$ hydrocarbon mixture product comprises ethylene, ethane, ethyne, propene, propane, $C_4$-$C_5$ hydrocarbons, carbon dioxide, carbon monoxide and combinations thereof. In some aspects of the invention, the invention describes a process for preparing a $C_{2+}$ hydrocarbon mixture product comprising (a) introducing a feed mixture comprising methane and oxygen in a reactor containing the composition comprising the catalyst of the present invention represented by the general formula (I); (b) subjecting the feed mixture to a methane coupling reaction under conditions suitable to produce the $C_{2+}$ hydrocarbon mixture product; and (c) recovering the $C_{2+}$ hydrocarbon mixture product after removing unconverted methane from the $C_{2+}$ hydrocarbon mixture product. In some aspects of the invention, unconverted methane produced during the reaction, is removed from the $C_{2+}$ hydrocarbon mixture product. In some embodiments of the invention, the removal of unconverted methane from the $C_{2+}$ hydrocarbon mixture product is effected using a distillation column. In some embodiments of the invention, the distillation column is a cryogenic distillation column.

Methane coupling reaction under conditions suitable to produce $C_{2+}$ hydrocarbon mixture product include appropriate temperature conditions, pressure conditions to effect the coupling reaction. In some embodiments of the invention, the feed mixture comprising methane and oxygen may be preheated to a temperature ranging from about 200° C. to about 550° C., prior to introducing the feed mixture in the reactor for methane coupling. The reactor can comprise an adiabatic reactor, an autothermal reactor, an isothermal reactor, a tubular reactor, a cooled tubular reactor, a continuous flow reactor, a fixed bed reactor, a fluidized bed reactor, a moving bed reactor, and the like, or combinations thereof. In one preferred aspect of the invention, the reactor can comprise an autothermal reactor with short bed. With the small particle size catalyst and short bed design, the pressure drop cross the reactor is within a reasonable range. With the short bed design, good heat back mixing can be achieved, as a result, low temperature feed can be used for reaction. In one preferred aspect of the invention, a 2.3 mm ID quartz tube reactor is used for the purposes of reacting oxygen with methane under conditions sufficient to effect the oxidative coupling of methane. In some aspects of the invention, the reactor can comprise an adiabatic reactor. In some aspects of the invention, the $C_{2+}$ hydrocarbon mixture product is produced at a reactor temperature ranging from about 200° C. to about 1000° C., alternatively from about 500° C. to about 950° C., alternatively from about 700° C. to about 900° C.

In some aspects of the invention, the reactor can comprise a catalyst bed comprising the composition capable of catalyzing the oxidative coupling of methane reaction. In some embodiments of the invention, the feed mixture has a methane to oxygen molar ratio ranging from about 2:1 to about 15:1, alternatively from about 4:1 to about 10:1, alternatively from about 5:1 to about 8:1. In some embodiments of the invention, the pressure in the reactor is maintained at a pressure sufficient to effect oxidative coupling of methane. The pressure may be maintained at a range of about 14.7 psi (ambient atmospheric pressure) to about 500 psi, alternatively at a range of about 14.7 psi (ambient atmospheric pressure) to about 200 psi, alternatively at a range of about 14.7 psi (ambient atmospheric pressure) to about 150 psi. In some embodiments of the invention, the feed mixture is introduced into the reactor at a gas hourly space velocity (GHSV) ranging from about 500 $h^{-1}$ to about 1,000,000 $h^{-1}$, alternatively from about 1,000 $h^{-1}$ to about 500,000 $h^{-1}$, alternatively from about 5,000 $h^{-1}$ to about 400,000 $h^{-1}$.

In some aspects of the invention, the composition containing the catalyst of the present invention, has a $C_{2+}$ product selectivity hydrocarbon selectivity ranging from about 71% to about to about 85%, alternatively from about 72% to about 80%, of the total product formed, when the composition is used in a process for producing $C_{2+}$ hydrocarbon mixture product from methane and oxygen. The expression "total product formed" used in the context of measuring product selectivity includes the products formed of $C_2H_4$, $C_3H_6$, $C_2H_2$, $C_2H_6$, $C_3H_8$, $C_{4S}$, $C_{5S}$, $C_{n's}$, $CO_2$ and CO.

For the purposes of this invention, oxygen conversion can be measured by using the equation: ($O_2$ (inlet)–$O_2$ (outlet)/ $O_2$ (inlet))×100, where $O_2$ (inlet) is the concentration of oxygen in terms of moles, at the inlet of the reactor and $O_2$ (outlet) is the concentration of oxygen, in terms of moles, at the outlet. For the purposes of this invention, oxygen conversion can be measured by comparing the oxygen concentration at the outlet and the inlet of an oxidative coupling of methane reactor, such a reactor being a 2.3 mm ID quartz tube reactor having a feed mixture flow rate adjusted from about 40 sccm at a catalyst loading of 20 mg. Accordingly, the invention includes various embodiments related to catalyst compositions that exhibit one or more benefits of (i) being capable of being produced at an industrial scale, (ii) having high product selectivity while retaining sufficient catalytic activity and suitable mechanical strength adapted for use in commercial operations.

Specific examples demonstrating some of the embodiments of the invention are included below. The examples are for illustrative purposes only and are not intended to limit the invention. It should be understood that the embodiments and the aspects disclosed herein are not mutually exclusive and such aspects and embodiments can be combined in any way. Those of ordinary skill in the art will readily recognize parameters that can be changed or modified to yield essentially the same results.

EXAMPLES

Purpose: The examples as provided here are of catalyst samples, which have the specific formula ($Sr_{0.5}La_{1.8}Yb_{0.1}Nd_{0.7}Ox/Al_2O_3$) and are used for demonstrating improved $C_{2+}$ hydrocarbon product selectivity along with suitable catalytic activity for the inventive catalyst samples (Samples 1-5) over that of the reference catalyst compositions (Reference catalyst 1 & 2).

Materials: The following materials are procured and used for the synthesis of the compositions (Inventive samples and Reference samples).

TABLE 1

Inventive catalyst composition ($Sr_{0.5}La_{1.8}Yb_{0.1}Nd_{0.7}O_x/Al_2O_3$)

| Catalyst composition: ($AE_aRE1_bRE2_cAT_dO_x$)/ $M_mO_n$ | Element/Compound used | Relative molar ratio | Precursor Material | Supplier |
|---|---|---|---|---|
| AE | Strontium (Sr) | a = 0.5 | Strontium Nitrate: $Sr(NO_3)_2$ | Sigma-Aldrich |
| RE1 | Lanthanum (La) | b = 1.8 | Lanthanum Nitrate $La(NO_3)_3 \cdot 6H_2O$ | Sigma-Aldrich |
| RE2 | Ytterbium (Yb) | c = 0.1 | Ytterbium Nitrate $Yb(NO_3)_3 \cdot 5H_2O$ | Sigma-Aldrich |
| AT = RE3 | Neodymium (Nd) | d = 0.7 | Neodymium Nitrate: $Nd(NO_3)_3 \cdot 6H_2O$ | Sigma-Aldrich |
| Alumina Sample 1 ($M_mO_n$) | Alumina ($Al_2O_3$) | | SA52238 Alumina (diameter-1.2 mm) | Saint-Gobain |
| Alumina Sample 2 ($M_mO_n$) | Alumina ($Al_2O_3$) | | SA52238 Alumina (diameter-0.45 mm) | Saint-Gobain |
| Alumina Sample 3 ($M_mO_n$) | Alumina ($Al_2O_3$) | | SA52238 Alumina (diameter-0.30 mm) | Saint-Gobain |

Method for preparing the composition containing the inventive catalyst having the formula ($Sr_{0.5}La_{1.8}Yb_{0.1}Nd_{0.7}Ox/Al_2O_3$): The inventive compositions containing the catalyst, were prepared by a general method of (a) an oxide catalyst support having spherical diameter of less than 2 mm was provided; (b) thereafter thermal treating the oxide catalyst support at any temperature ranging from 1100° C. to 1700° C. and forming the thermally treated oxide catalyst support; (c) an aqueous solution of a mixed metal oxide precursor comprises at least one compound containing a compound containing an alkaline earth metal 'AE', at least one compound containing a first rare earth element 'RE1', at least one compound containing a second rare earth element 'RE2' and at least one compound containing a third rare earth element 'RE3', was provided; (d) subsequently, the thermally treated oxide catalyst support was impregnated with the aqueous solution of the mixed metal oxide precursor and the supported catalyst precursor was formed; and (e) thereafter the supported catalyst precursor was calcined at a temperature of at least 850° C. and for at least 5 hours, and the inventive compositions was obtained.

More specifically, the method included the step of, obtaining the aqueous solution of the mixed metal oxide precursor by dissolving 1.3 g of strontium nitrate ($Sr(NO_3)_2$), 9.57 g of lanthanum nitrate ($La(NO_3)_3 \cdot 6H_2O$), 3.77 g of neodymium nitrate ($Nd(NO_3)_3 \cdot 6H_2O$) and 0.49 g of ytterbium nitrate ($Yb(NO_3)_3 \cdot 6H_2O$) in 15 mL of distilled water in the proportion (Sr:Yb:La:Nd) 0.5:0.1:1.8:0.7.

Three sets of alumina (aluminum oxide $Al_2O_3$) were procured for creating the reference catalyst composition. Particles of the Alumina Sample 1 had a spherical diameter of 1.2 mm, particles of Alumina Sample 2 had a spherical diameter of 0.45 mm and particles of Alumina Sample 3 had a spherical diameter of 0.30 mm. The alumina samples which were intended to be used for preparing the inventive samples were thermally treated at various temperature to form the thermally treated oxide catalyst support. Each of the thermally treated oxide catalyst support, were thereafter impregnated with the aqueous solution of a mixed metal oxide precursor to form the supported catalyst precursor, which was subsequently dried at 120° C. followed by calcination at 900° C. for 6 hours to obtain the inventive compositions (Inventive Samples 1-5).

For preparing the control samples, Reference 1 Sample and Reference 2 Sample, the process for preparing the composition was identical as that described for the inventive samples except that the oxide catalyst support was not subjected to thermal treatment. For Inventive Samples 1-2 and Reference 1 Sample, the composition obtained after calcination was crushed to 40 to 60 mesh for reactor testing. For samples Inventive Samples 3-5 and Reference 2 Sample, no further crushing was performed.

Process for producing $C_{2+}$ hydrocarbon mixture product using the composition of Inventive Samples 1-5: Each of the composition containing the Inventive Samples, were thereafter used for producing $C_{2+}$ hydrocarbon mixture product using the process comprising (a) introducing a feed mixture comprising methane and oxygen in a reactor containing the inventive compositions Inventive Samples 1-5; (b) subjecting the feed mixture to a methane coupling reaction under conditions suitable to produce the $C_{2+}$ hydrocarbon mixture product; and (c) recovering the $C_{2+}$ hydrocarbon mixture product after removing unconverted methane from the $C_{2+}$ hydrocarbon mixture product.

More particularly, during testing, each of the Inventive Samples and the Reference Samples 1-2, were placed in a 2.3 mm ID quartz tube, and were contacted with a feed mixture containing methane and oxygen. The ratio of methane to oxygen was adjusted to a molar ratio of 7.4:1 and the feed mixture flow rate was adjusted from 40 sccm. The catalyst loading was maintained for at 40.8%. The expression "catalyst loading" as used herein means the amount of active mixed metal oxide component $(AE_aRE1_bRE2_cAT_dO_x)$ that is impregnated in the oxide catalyst support $(M_mO_n)$ and is expressed in terms of the weight of the total catalyst (oxide catalyst+support). For the purposes of the present examples, the amount of composition containing the catalyst was 20 mg.

Water sorption volume of the oxide catalyst support particle was measured by the incipient wetness method. The method involved the following process: To a given amount of support particle, which were dried overnight at 120° C., measured amount of water was added to the support until a point where the water was seen to seep out of the support particles. At this point the total volume of water that had been added was noted which represented the water sorption volume.

Surface area of the oxide catalyst support particle was measured according to the Brunauer, Emmett and Teller (BET) method. The BET experiment was carried out by using Quantachrome Autosorb®-6iSA. Mechanical Strength of the Inventive Samples 1-5 and Reference 1 Sample, were measured using ASTM (D4179-01). For the purpose of measurement, the crush test was repeated for each sample for a reasonable number of time and the resulting data was averaged and reported. The mechanical strength as measured was found to be higher (~80 N) than what was reported by the supplier, which was around 30 N.

The inventive samples, Inventive Samples 1-5, and Reference 1 and Reference 2 Samples were subjected identical oxidative methane coupling conditions. The reactor temperature was gradually changed from 450° C. to 850° C. and the catalyst performance was recorded. The highest $C_{2+}$ hydrocarbon product selectivity and the lowest obtained are used for comparison. The $C_{2+}$ hydrocarbon mixture product so obtained was analyzed using online Gas Chromatograph, Agilent 7890 GC, having a thermal conductivity detector (TCD) and a flame ionization detector (FID). The performance of the inventive compositions (Inventive Samples 1-5), in terms of selectivity and activity are reported below and compared with the catalyst performance of Reference 1 and Reference 2.

Results: The catalyst performance obtained for Inventive Samples 1-5 with regards to Reference 1 and Reference 2 is provided below.

As shown in Table 2, for the inventive samples, it is evident that the samples which were prepared using thermal treatment of the oxide catalyst support, demonstrated improved balance in selectivity (higher value of $C_{2+}$ hydrocarbon selectivity) and catalytic activity (low T90% value). Further, the experiment results shown in Table 2, the Inventive Samples 1 and 2 demonstrate that, when an optimum balance of water sorption volume and surface area is achieved, the resultant catalyst system demonstrates suitable performance as intended by the present invention. For Inventive Sample 2, the surface area value was determined using data extrapolation technique, using the data of Inventive Sample 1 and Reference 1 Sample, to obtain the surface area (<3 mm). From the results obtained for Inventive Sample 5, it is further evident that, when smaller sized alumina (aluminum oxide) support particles (0.3 mm) were used to prepare the catalyst and were subjected to high temperature thermal treatment, the resultant catalyst system demonstrated desired levels of catalyst performance of high selectivity while retaining suitable activity.

The invention claimed is:

1. A composition, comprising a catalyst represented by a general formula (I):

$$(AE_aRE1_bRE2_cAT_dO_x)/M_mO_n$$

wherein,
(i) 'AE' represents an alkaline earth metal;
(ii) 'RE1' represents a first rare earth element;
(iii) 'RE2' represents a second rare earth element;
(iv) 'AT' represents a third rare earth element 'RE3', or a redox agent 'RX' selected from the group consisting of antimony, tin, nickel, chromium, molybdenum, tungsten, manganese, and bismuth; wherein, 'a', 'b', 'c', and 'd' each independently represent relative molar ratio; wherein 'a' ranges from about 0.1 to about 5; 'b' ranges from about 0.1 to about 10; 'c' ranges from 0.1 to about 10; 'd' ranges from 0 to about 10;'x' balances the oxidation state; wherein, the first rare earth element, the second rare earth element and the third rare earth element, are different; and
(v) $M_mO_n$ represents an oxide catalyst support, wherein 'M' is selected from a metal or silicon; 'm' and 'n' are any positive number and ranges from about 1 to about 5; wherein, the oxide catalyst support comprises particles having a spherical diameter of less than 2 mm; wherein the oxide catalyst support comprises particles

TABLE 2

Results ($Sr_{0.5}La_{1.8}Yb_{0.1}Nd_{0.7}O_x/Al_2O_3$)

|  | Spherical Particle Diameter of Support | Thermal Treatment ° C. | T90% (Oxygen conversion) ° C. | $C_{2+}$ hydrocarbon product selectivity % | Water sorption Volume (cc/g) | Surface Area (m²/g) | Mechanical Strength (N) |
|---|---|---|---|---|---|---|---|
| Reference 1 Sample | 1.2 mm | NA | 625 | 70.2 | 0.58 | 9.9 | ~80 |
| Inventive Sample 1 | 1.2 mm | 1450 | 600 | 73.1 | 0.48 | 3.5 | ~80 |
| Inventive Sample 2 | 1.2 mm | 1500 | 650 | 74.3 | 0.47 | <3 | ~80 |
| Reference 2 Sample | 0.45 mm | NA | 675 | 73.3 |  |  |  |
| Inventive Sample 3 | 0.45 mm | 1500 | 700 | 75.4 |  |  |  |
| Inventive Sample 4 | 0.45 mm | 1600 | 650 | 75.5 |  |  |  |
| Inventive Sample 5 | 0.30 mm | 1600 | 650 | 76.3 |  |  |  | having a surface area less than 9.5 m²/g; and further wherein the oxide catalyst support has a water sorption volume of at least 0.2 cc/g.

2. The composition of claim 1, wherein the oxide catalyst support comprises particles having a surface area ranging from 0.01 m²/g to 9 m²/g.

3. The composition of claim 1, wherein the oxide catalyst support comprises particles having a spherical diameter ranging from 0.1 mm to 0.95 mm.

4. The composition of claim 1, wherein the oxide catalyst support has a water sorption volume ranging from 0.3 cc/g to 0.8 cc/g.

5. The composition of claim 1, wherein the oxide catalyst support has a mechanical strength of at least 10 N when determined in accordance with ASTM (D4179-01).

6. The composition of claim 1, wherein the oxide catalyst support comprises particles having a surface area ranging from 0.01 m²/g to 9 m²/g and a water sorption volume ranging from 0.3 cc/g to 0.8 cc/g.

7. The composition of claim 1, wherein the alkaline earth metal 'AE' is selected from the group consisting of magnesium, calcium, strontium, barium, and combinations thereof.

8. The composition of claim 1, wherein the alkaline earth metal 'AE' is strontium.

9. The composition of claim 1, wherein the first rare earth element 'RE1', the second rare earth element 'RE2', and the third rare earth element 'RE3', are each independently selected from the group consisting of lanthanum, scandium, cerium, praseodymium, neodymium, promethium, samarium, europium, gadolinium, yttrium, terbium, dysprosium, holmium, erbium, thulium, ytterbium, lutetium, and combinations thereof.

10. The composition of claim 1, wherein the metal 'M' of the oxide catalyst support $M_mO_n$ is selected from the group consisting of aluminum, zinc, tin (II), and lead (II).

11. The composition of claim 1, wherein the oxide catalyst support $M_mO_n$ is aluminum oxide ($Al_2O_3$) comprising particles having a spherical diameter of less than 2 mm.

12. The composition of claim 1, wherein the alkaline earth metal 'AE' is strontium, the first rare earth element 'RE1' is lanthanum, the second rare earth element 'RE2' is ytterbium, the third rare earth element 'RE3' is neodymium and the oxide catalyst support is aluminum oxide ($Al_2O_3$) comprising particles having a spherical diameter of less than 2 mm.

13. The composition of claim 1, wherein the catalyst of general formula (I) is represented by a specific formula $Sr_aLa_bYb_cNd_dO_x/Al_2O_3$, wherein 'a' ranges from about 0.1 to about 0.6; 'b' ranges from about 0.5 to about 3; 'c' ranges from about 0.1 to about 0.8; and 'd' ranges from about greater than zero to about 0.4, and further wherein the aluminum oxide ($Al_2O_3$) has a spherical particle diameter of less than 2 mm.

14. The composition of claim 1, wherein the catalyst of general formula (I) is represented by the specific formula $Sr_{0.5}La_{1.8}Yb_{0.1}Nd_{0.7}O_x/Al_2O_3$ and further wherein the aluminum oxide ($Al_2O_3$) has a spherical particle diameter of less than 2 mm.

15. A method for preparing the composition according to claim 1, the method comprising:
 a. providing an oxide catalyst support having spherical diameter of less than 2 mm;
 b. thermal treating the oxide catalyst support at a temperature ranging from 1100° C. to 1700° C. and forming a thermally treated oxide catalyst support;
 c. providing an aqueous solution of a mixed metal oxide precursor comprising at least one compound containing an alkaline earth metal 'AE', at least one compound containing a first rare earth element 'RE1', at least one compound containing a second rare earth element 'RE2' and at least one compound containing a third rare earth element 'RE3';
 d. impregnating the thermally treated oxide catalyst support with the aqueous solution of the mixed metal oxide precursor and forming a supported catalyst precursor, and
 e. calcining the supported catalyst precursor at a temperature of at least 850° C. and for at least 5 hours, and forming the composition.

16. The method according to claim 15, wherein the oxide catalyst support is thermally treated at a temperature ranging from 1200° C. to 1600° C.

17. The method according to claim 15, wherein the compound containing the alkaline earth metal 'AE', the first rare earth element 'RE1', second rare earth element 'RE2' and third rare earth element 'RE3' are selected from the group consisting of a nitrate compound, halogen compound, carbonate compound, sulphate compound and a sulphite compound.

18. A process for producing a $C_{2+}$ hydrocarbon mixture product, comprising:
 (a) introducing a feed mixture comprising methane and oxygen in a reactor containing the composition according to claim 1;
 (b) subjecting the feed mixture to a methane coupling reaction under conditions to produce the $C_{2+}$ hydrocarbon mixture product; and
 (c) recovering the $C_{2+}$ hydrocarbon mixture product after removing unconverted methane from the $C_{2+}$ hydrocarbon mixture product.

19. A composition, comprising a catalyst represented by a general formula (I):

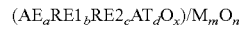

$(AE_aRE1_bRE2_cAT_dO_x)/M_mO_n$ wherein,
 (i) 'AE' represents an alkaline earth metal;
 (ii) 'RE1' represents a first rare earth element;
 (iii) 'RE2' represents a second rare earth element;
 (iv) 'AT' represents a third rare earth element 'RE3', or a redox agent 'RX' selected from the group consisting of antimony, tin, nickel, chromium, molybdenum, tungsten, manganese, and bismuth; wherein, 'a', 'b', 'c', and 'd' each independently represent relative molar ratio; wherein 'a' ranges from about 0.1 to about 5; 'b' ranges from about 0.1 to about 10; 'c' ranges from 0.1 to about 10; 'd' ranges from 0 to about 10; 'x' balances the oxidation state; wherein, the first rare earth element, the second rare earth element and the third rare earth element, are different; and
 (v) $M_mO_n$ represents an oxide catalyst support, wherein 'M' is selected from a metal or silicon; 'm' and 'n' are any positive number and ranges from about 1 to about 5; wherein, the oxide catalyst support comprises particles having a spherical diameter of less than 2 mm; wherein the oxide catalyst support comprises particles having a surface area less than 9.5 m²/g; and further wherein the oxide catalyst support has a water sorption volume of at least 0.2 cc/g; and wherein, the composition is prepared by a method comprising the thermal treatment of the oxide catalyst support at temperature ranging from 1100° C. to 1700° C.

* * * * *